(12) United States Patent
Crisp et al.

(10) Patent No.: US 9,132,871 B2
(45) Date of Patent: Sep. 15, 2015

(54) LOW PROFILE WALKING MACHINE AND METHOD OF OPERATION

(71) Applicant: Columbia Industries LLC, Hillsboro, OR (US)

(72) Inventors: Ira Crisp, Hillsboro, OR (US); Steven A. Csergei, Hillsboro, OR (US); Duane Wasson, Hillsboro, OR (US)

(73) Assignee: Columbia Trailer Co., Inc., Hillsboro, OR (US)

( * ) Notice: Subject to any disclaimer, the term of this patent is extended or adjusted under 35 U.S.C. 154(b) by 0 days.

(21) Appl. No.: 13/841,808

(22) Filed: Mar. 15, 2013

(65) Prior Publication Data

US 2014/0271094 A1    Sep. 18, 2014

(51) Int. Cl.

| B62D 51/06 | (2006.01) |
| B62D 57/02 | (2006.01) |
| E21B 15/00 | (2006.01) |
| B62D 57/032 | (2006.01) |

(52) U.S. Cl.
CPC ............... *B62D 57/02* (2013.01); *E21B 15/00* (2013.01); *B62D 57/032* (2013.01)

(58) Field of Classification Search
CPC .............................. B62D 57/032; B62D 57/02
USPC .............................................. 180/8.1, 8.5, 8.6
See application file for complete search history.

(56) References Cited

U.S. PATENT DOCUMENTS

| 3,853,196 A | 12/1974 | Guest |
| 4,202,423 A * | 5/1980 | Soto .............................. 180/8.6 |
| 4,565,487 A * | 1/1986 | Kroczynski ................... 414/730 |
| 5,492,436 A | 2/1996 | Suksumake |
| 5,921,336 A | 7/1999 | Reed |
| 6,581,525 B2 | 6/2003 | Smith |
| 7,681,674 B1 | 3/2010 | Barnes et al. |
| 7,819,209 B1 | 10/2010 | Bezner |
| 8,051,930 B1 | 11/2011 | Barnes et al. |
| 8,561,733 B2 * | 10/2013 | Smith et al. ..................... 180/8.1 |
| 2002/0185319 A1 | 12/2002 | Smith |
| 2010/0252395 A1* | 10/2010 | Lehtonen et al. ............. 198/300 |
| 2014/0014417 A1* | 1/2014 | Smith et al. .................... 180/8.1 |

* cited by examiner

*Primary Examiner* — Joseph Rocca
*Assistant Examiner* — Marlon Arce
(74) *Attorney, Agent, or Firm* — Kolisch Hartwell, PC (57) ABSTRACT

A walking system for moving a load over the ground includes a substructure having laterally spaced-apart, rigidly interconnected main beams for carrying the load. A jack support beam is mounted as a cantilever on top of each main beam, and each includes a lifting jack assembly. Each lifting jack assembly includes a power-driven hydraulic cylinder having a ram and foot plate, and each is selectively operable for extending a ram downwardly to force the foot plate against the ground to raise the substructure off the ground, and for retraction to disengage the foot plates from the ground, thereby lowering the substructure to the ground. Each jack lifting assembly includes a shifter mechanism operable for displacing the main beams and the substructure along the ground in a selected steering mode when the lifting jack assemblies are actuated to raise the main beams and the substructure above the ground.

18 Claims, 5 Drawing Sheets

LOW PROFILE WALKING MACHINE AND METHOD OF OPERATION

BACKGROUND OF THE DISCLOSURE

The present disclosure is directed to walking machines, and more particularly to large walking machines operable for transporting massive and heavy loads, upwards of thousands of tons, over the ground. These are designed as non-wheeled, power-driven vehicles fabricated from iron and steel, and are very useful for carrying and sequentially transporting huge structures such as oil drilling rigs and their support or service modules to pre-drilled, ground-installed conductor pipes. This is may be done prior to drilling well bores in fields undergoing oil exploration, or over existing well bores in previously-worked old fields, or the like.

The present disclosure is directed to a walking machine and its substructure for transporting heavy machinery or equipment from one location to another, and more particularly to a walking machine which can be moved along a straight line or also steered in different directions. The walking machine is steered so that it is moved to align or orient equipment such as a drilling rig precisely above a well bore, or move to another area entirely. The lifting assemblies provided on the walking machine incorporate a design enabling the main beams supporting the substructure to present a low profile.

Examples of Prior Art Walking Machines and Systems

There are numerous examples of walking machines and systems which have been designed for use in moving drilling rigs for positioning over well bores during oil exploration. An example of a known walking machine is disclosed in U.S. Pat. No. 6,581,525 where a load-carrying transport apparatus for moving a heavy load, such as an oil drilling rig, over a surface includes a substructure for carrying the load, a track member positioned on the surface adjacent the substructure and a plurality of lift assemblies mounted on the substructure selectively operable for extension toward the surface to engage the track member and raise the substructure above the surface so that it is carried on the track member. The lift assemblies are also operable for retraction to lower the substructure onto the surface.

A shifter mechanism disposed adjacent to the substructure and the track member is selectively operable for displacing the substructure along the track member when the lifting assemblies have been extended toward the surface to raise the substructure above the surface. The shifter mechanism is also operable for displacing the track member on the surface relative to the substructure when the lifting assemblies have been retracted and disengaged from the track member. The track member is dimensioned to provide a steering area and at least one of the lifting assemblies is selectively positionable to a predetermined angle within a range for moving in the steering area along the track member so that the load-carrying apparatus can be steered along a selected direction.

Another example of a walking machine is disclosed in U.S. Pat. No. 5,921,336 in which a drilling rig substructure is provided with a plurality of lifting jacks, and each lifting jack is connected to a jack pad. Roller assemblies are mounted at the lower end of the lifting jacks and each jack pad has a center beam that the roller assemblies engage. The jack pads are rotatable in 360° about a vertical axis. A push-pull mechanism extends between each jack pad and each roller assembly to move the rollers horizontally in relation to the jack pad. In operation, when it is desired to move to a well bore, the lifting jacks are extended, forcing the jack pad against the ground.

Continued extension causes the upper end of the lifting cylinder to raise the substructure and accompanying drilling rig to move from ground level. The lifting jacks now remain in the extended position and the push-pull mechanisms are then actuated to move the substructure in a given direction. The lifting jacks are then retracted so that the substructure returns to the ground and the jack pad is then raised and moved to a new position.

A further example of the prior art is U.S. Pat. No. 7,819,209 which describes a guided transport unit for moving a superstructure in angular movements over a surface. There is disclosed a skid pad, a vertical displacing member engaged with the skid pad, a base operatively associated with the vertical displacing member, and a directional actuator. The base includes a planar element for engaging the surface over which the superstructure is transported, and a carrier for moving the vertical displacing member and skid pad relative to the surface. The disclosure shows that the side walls of the skid pads are provided with openings to enable the guided main structures to pivoted to extend at least partially outside of the skid pads.

SUMMARY OF THE DISCLOSURE

The present disclosure is directed to a "rig walker" or more generally to a walking machine and its substructure for transporting heavy machinery or equipment from one location to another, and more particularly to a walking machine for moving a load over the ground during oil field operations. Generally, the present disclosure is directed to a walking machine constructed with a substructure having laterally spaced-apart, rigidly interconnected first and second main beams, or "skids," and includes a first lifting assembly mounted on a first end of each main beam and a second lifting assembly mounted on the opposite or second end of each main beam. The main beams form the lower part of the substructure, and the entire arrangement may be raised above the ground and transported, carrying the load, in a preselected or given direction by means of a plurality of lifting assemblies.

Each lifting assembly is designed with a hydraulic power-driven cylinder and extendable/retractable rod connected to a plunger element with a foot plate. The power-driven cylinders are selectively operable for extending their rods to push the plunger elements downwardly to force the foot plates against the ground to raise the main beams and substructure off the ground. The rods may be retracted to pull the plunger elements upwardly to disengage the foot plates from the ground to lower the main beams and substructure. A first shifter mechanism is mounted on each first lifting assembly selectively operable for extension and retraction, ands a second shifter mechanism is mounted on each second lifting assembly selectively operable for extension and retraction.

The first and second shifter mechanisms operate to extend and retract in opposition to one another to displace the main beams and the substructure along the ground on the foot plates in a selected direction when the first and second lifting assemblies have raised the main beams and the substructure off the ground.

In a preferred embodiment, the power-driven cylinder of each first lifting assembly is diagonally-mounted on each main beam with its rod directed upwardly toward the first end, and the power-driven cylinder of each second lifting assembly is diagonally-mounted on each main beam with its rod directed upwardly toward the second end. This enables a lower overall profile of the main beam structure and consequently of the walking machine.

Furthermore, each first lifting assembly may be designed to include a pair of hydraulic power-driven cylinders, diagonally-mounted, side-by-side on each main beam with their rods directed upwardly toward the first end of each main beam. Each second lifting assembly may be designed also to include a pair of hydraulic power-driven cylinders, diagonally-mounted, side-by-side on each main beam with their rods directed upwardly toward the second end of each main beam.

The walking machine may also be used as service module, supported on a substructure separate from that of the drilling rig, to provide the necessary auxiliary equipment for the drilling rig. This equipment may include engines, pumps, motors, pipe storage, fuel, and mud pumps, to name a few, necessary for operating the drilling rig. The service module is interconnected with the necessary hoses, pipes, electrical conduits, etc. to the drilling rig. The service module and drilling rig may each have an operator's cab, so that the operators of these two massive modules can control the necessary positioning of their respective substructures and loads. The drilling rig and service modules can together weigh upwards of 4-5,000 tons.

DETAILED DESCRIPTION OF THE PREFERRED EMBODIMENT

As stated at the outset, the present disclosure is generally directed to a walking system for moving a load over the ground, such as a drilling rig or service module which is constructed as a substructure supported by two main beams. A specially-designed lift mechanism or lifting assembly for mounting on the main beams to facilitate raising and lowering and displacement of the main beams is disclosed. As shown in the perspective view of FIG. 1, a walking machine is generally indicated at 10, and includes a substructure 12 supported by a pair of spaced-apart, rigidly interconnected first and second main beams 14 and 16, respectively, commonly referred to as "skids." Each main beam is constructed as a pair of interconnected beams, for example main beam 14 is designed with beams 18 and 20 interconnected by cross members and diagonals, and main beam 16 is designed with beams 22 and 24 interconnected also with cross members and diagonals.

Figure 1:
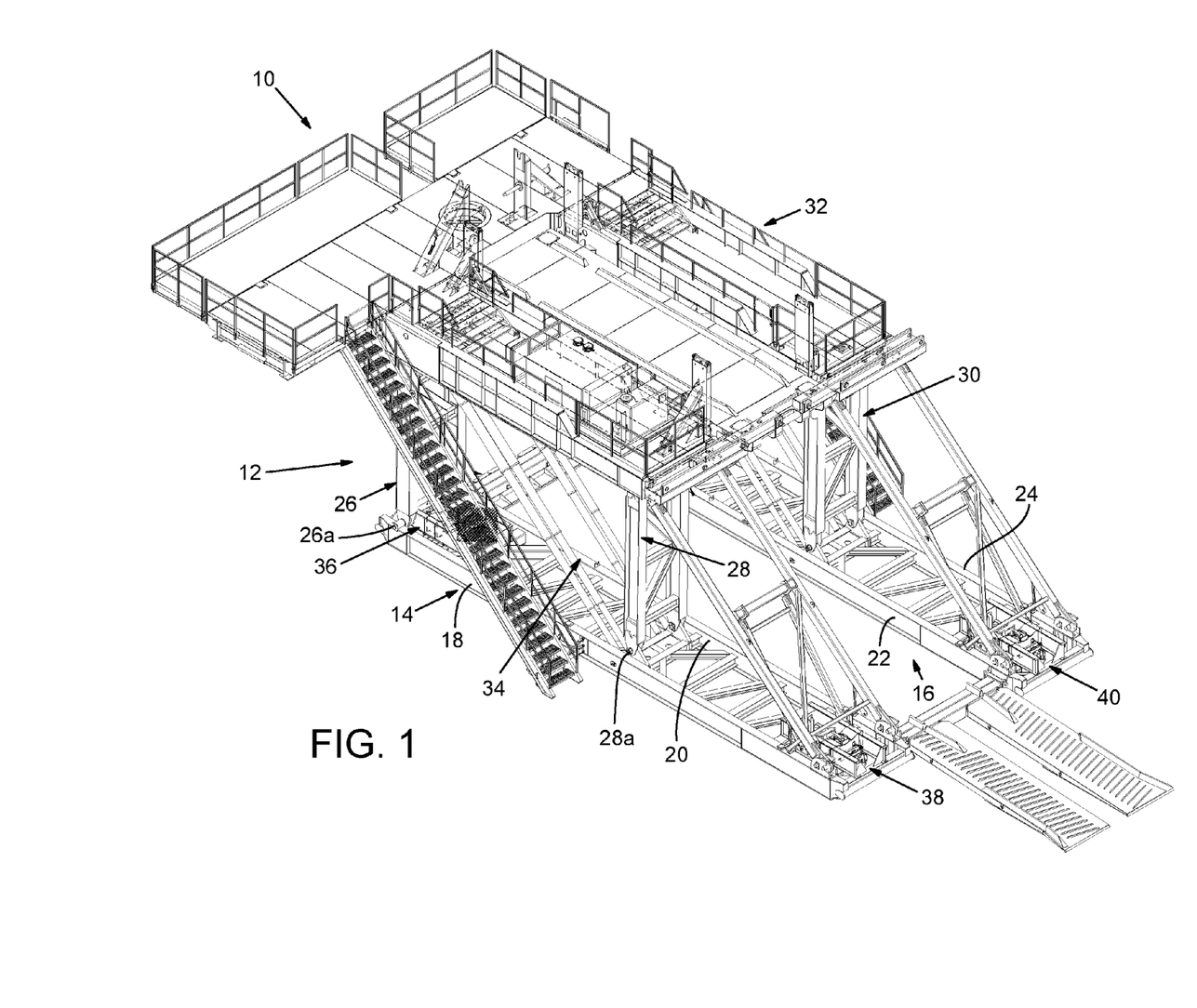
FIG. 1 is a perspective view of a walking machine illustrating a pair of spaced-apart main beams or "skids" supporting a substructure and upper deck with lifting mechanisms (one hidden) are shown generally at the ends of each main beam in accordance with the present disclosure.

The main beams form the lower part of the substructure, and are rigidly interconnected by a network of support struts or cross members (not shown here). Substructure 12 includes pivotally mounted, spaced-apart upright supports, formed as a frame structure, two of which are illustrated at 26 and 28 on main beam 14, and one of which is indicated at 30 on main beam 16, the other upright being hidden from view. A platform or deck generally indicated at 32 is designed to function as the floor for a drilling rig or for equipment carried on a service module. Main beams 14 and 16 bear the weight of a platform 32 and its load, that is a drilling rig or service module having support equipment, neither shown here. Uprights 26, 28, 30 and the one not shown are pivotally connected at their opposite ends to the platform and their respective main beams so that the platform may be swung into position for raising and lowering.

A telescopic strut arrangement is shown generally at 34, and there are two pairs of these mounted on each beam connected also to platform 32. The telescopic struts may be selectively operated in unison for raising platform 32 above main beams 14 and 16, and lowering them after a drilling operation has concluded, for example.

It will also be noted in FIG. 1 that the walking machine is outfitted with lifting assemblies operable for raising and lowering the main beams and "walking" the main beams and substructure along the ground as a unit. Each of these lifting assemblies will be made essentially identically; a first lifting assembly is shown at 36 mounted on a first end of main beam 14 and a second lifting assembly 38 is mounted on the opposite, or second end of main beam 14. The first lifting assembly on the first end of main beam 16 is hidden from view, but the second lifting assembly is shown 40 mounted on the second end of beam 16. Each of these lifting assemblies is mounted on its own subframe on the main beams, and details of construction of the lifting assemblies will follow.

Figure 2:
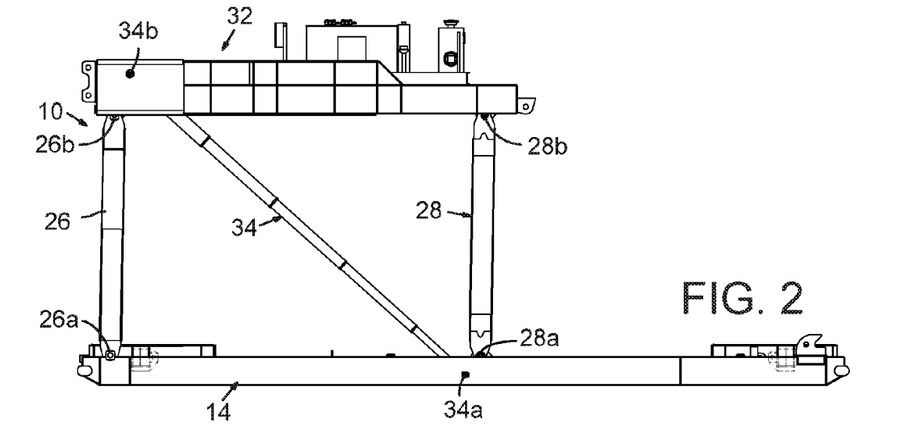
FIG. 2 is schematic side elevation view of the walking machine of FIG. 1, showing the substructure deployed in its raised position in accordance with the present disclosure in accordance with the present disclosure.
Figure 3:
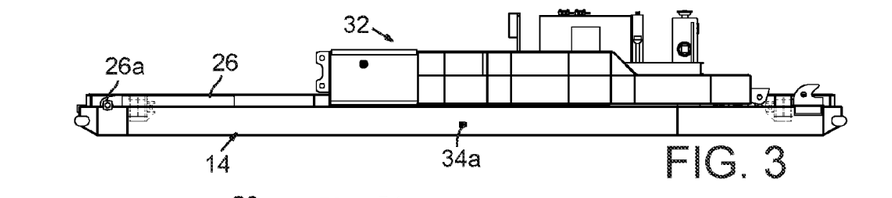
FIG. 3 is a side elevation view of the walking machine of FIG. 2 with the substructure folded down or retracted to be supported against the main beams in accordance with the present disclosure.

The basic outline of the walking machine is presented in the much simplified views of FIGS. 2 and 3, which show the substructure in deployed and retracted or folded down positions, respectively. FIG. 2 shows the pivot mounts at 26a and 26b for upright 26 on main beam 14, and pivot mounts 28a and 28b for upright 28 on main beam 14. Telescopic strut 34 is shown in its extended position in FIG. 2, with its pivots 34a and 34b shown on main 14 and platform 32, respectively. Equipment is shown on top of platform 32, and in the retracted position shown in FIG. 3 the entire structure has a lower profile, more suitable for longer distance transport.

Figure 4:
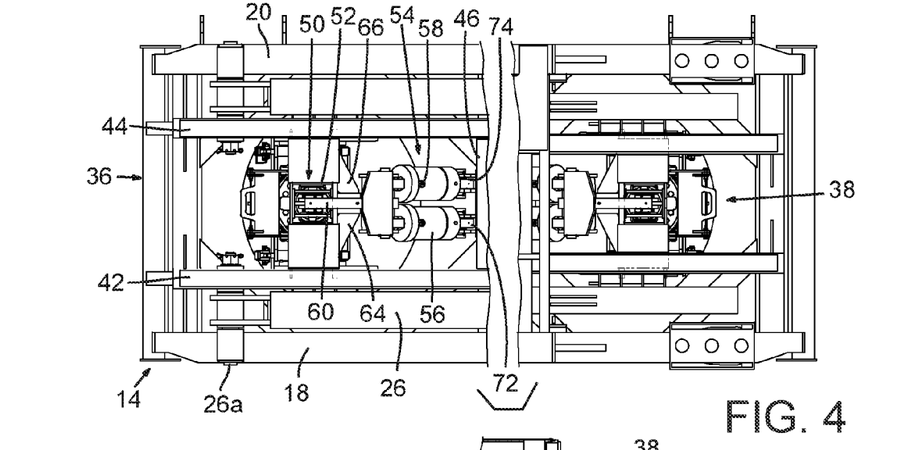
FIG. 4 is an enlarged top plan view of the walking machine of FIG. 3, broken along its length to show the lifting assemblies mounted in the left and right end sections of the walking machine in accordance with the present disclosure.

Attention is now directed to FIG. 4 which shows a top plan view, enlarged, of that of FIG. 3, with the length of the machine broken away to show main beam 14 more clearly and some details of first lifting assembly 36 and how it is mounted on main beam 14. The first assemblies are mounted on the first ends of main beams 14 and 16 the same way, and the second lifting assemblies are mounted on the second ends of main beams 14 and 16 the same way. The following discussion focuses on first lifting assembly 36 on main beam 14, it being recognized that mounting of the second lifting assembly on main beam 14 is mounted differently, as will be explained.

Figure 5:
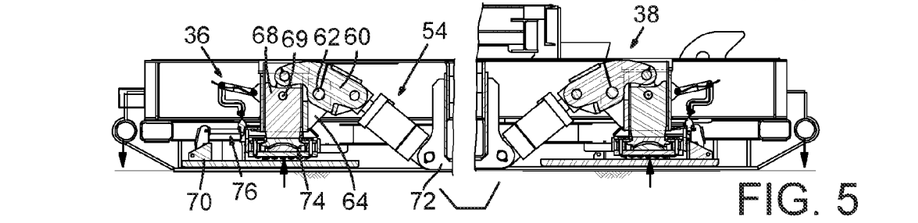
FIG. 5 is an enlarged cross-sectional view, taken along section A-A of FIG. 4, with portions cut away to show details of the lifting assemblies on the left and right ends in accordance with the present disclosure.
Figure 6:
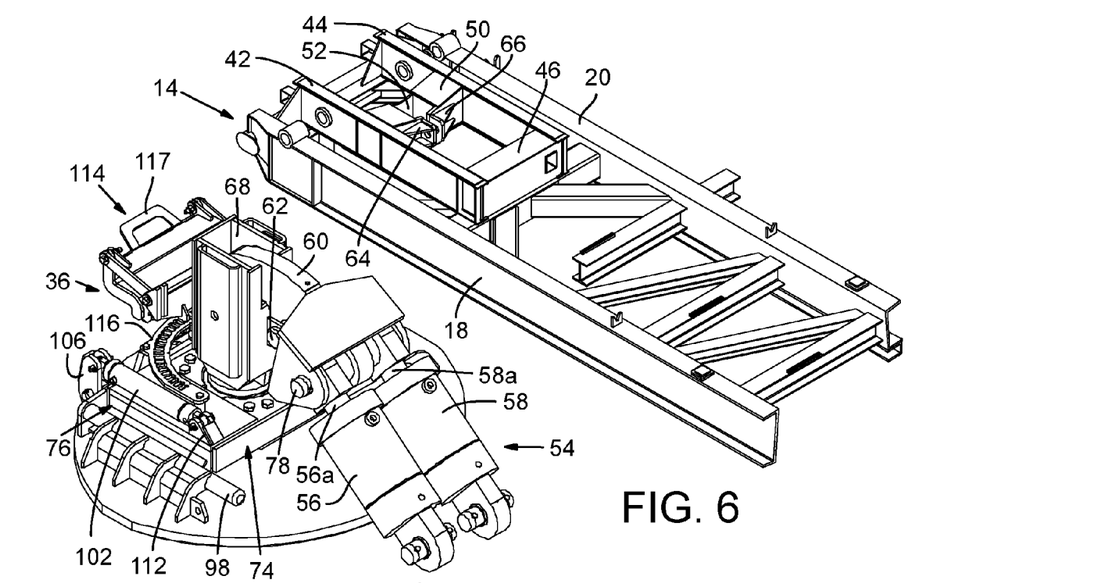
FIG. 6 is an enlarged perspective view of the left side of a main beam, and shows a subframe mounted on the left end of a main beam supporting a well mounting for receiving a first lift assembly. Also shown is an enlarged view of a first lifting assembly for mounting on the first or left end of the main beam shown in FIG. 6 in accordance with the present disclosure.
Figure 7:
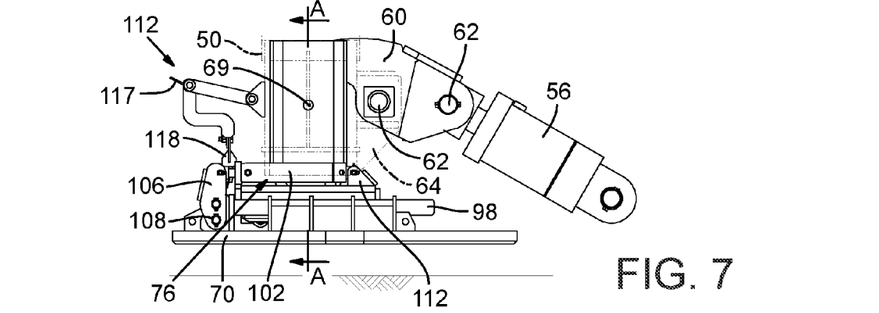
FIG. 7 is an enlarged isolated view of a lifting assembly removed from the walking machine in accordance with the present disclosure.

As shown in FIG. 4, first lifting assembly 36 is mounted on a subframe having sides 42 and 44 interconnected to an end 46 (see also subframe shown in FIG. 6). A well housing is shown generally at 50 mounted to the subframe having an opening or well 52 dimensioned for slideably receiving a plunger element, to be described, for reciprocal vertical movement therewithin (see also FIG. 6). First lifting assembly 36 includes a hydraulic power-driven cylinder arrangement shown at 54, specifically, a pair of hydraulic power-driven cylinders 56 and 58 each with an extendable/retractable rod connected to a rocker arm 60 which is pivotally connected at 62 to brackets 64 and 66 on well housing 50 (see also FIGS. 5 and 6). a well housing mounted on each main beam Rocker arm 60 in turn is connected to a plunger element 68 which can engage a foot plate 70. As shown in FIG. 5 plunger element 68 is mounted for reciprocal vertical movement in well 52 (see FIG. 6). Foot plate 70 is shown in cross-sectional in FIG. 5, and cylinders 56 and 58 are seen to be pivotally connected to brackets 72 and 74, respectively, which are mounted on end wall 46 of the subframe.

The power-driven cylinders on first lifting assembly 36 are diagonally-mounted, side-by-side on the first end of main beam 14 with their rods directed diagonally upward toward the first end of the main beam. While not shown, it is to be understood that the first lifting assembly on main beam 16 is mounted in the same manner. As also shown in FIGS. 4 and 5, the power-driven cylinders of second lifting assembly 38 are diagonally-mounted, side-by-side on the second end of main beam 14, but oriented so their rods are directed diagonally upward toward the second end of main beam 14. Second lifting assembly 40 on main beam 16 is mounted in the same manner.

Power-driven cylinders 56 and 58 are selectively operable for extending their rods to push plunger element 68 downwardly to force foot plate 70 against the ground. That action, in conjunction with simultaneous action from the other lifting assemblies, will raise the main beams and substructure off the ground. When the power-driven cylinders are actuated to retract their rods to pull their plunger elements upwardly to disengage the foot plates from the ground, the main beams and substructure will be lowered.

FIG. 5 also shows a roller assembly generally indicated at 74, and a first shifter mechanism generally indicated at 76, mounted on first lifting assembly selectively operable for extension and retraction to displace the foot plate relative to the well housing and consequently main beam 14. It can be seen in FIGS. 4 and 5 that second lifting assembly 40 includes all the same components and structure as first lifting assembly 38, except that it is arranged to face in the other direction.

Figure 8:
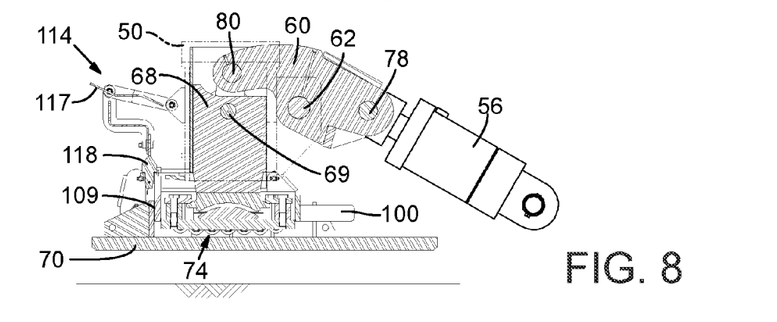
FIG. 8 is a view similar to FIG. 7 showing in the lifting assembly's rocker arm, plunger, roller assembly and foot plate in cross section for purposes of viewing the relationship of components in accordance with the present disclosure.

FIG. 6 also shows in perspective view first lifting assembly 36 adjacent to the first end of main beam 14, but not mounted in position, so details that might be hidden can be shown. Power-driven cylinders 56 and 58 are mounted at an angle so the end of their rods, 56a and 58a, respectively, are pivotally connected by a pin 78 to a first end of the rocker arm. The second end of rocker arm 60 is pivotally connected at 80 to a link and a pin 69 to plunger element 68 (see FIG. 8).

Figure 9:
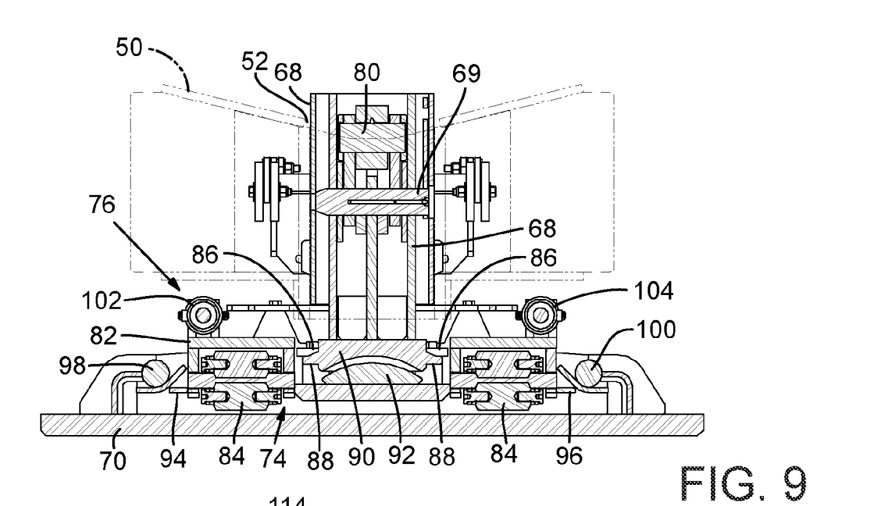
FIG. 9 is a cross sectional view taken along lines A-A of the lifting assembly shown in FIG. 7 in accordance with the present disclosure.
Figure 10:
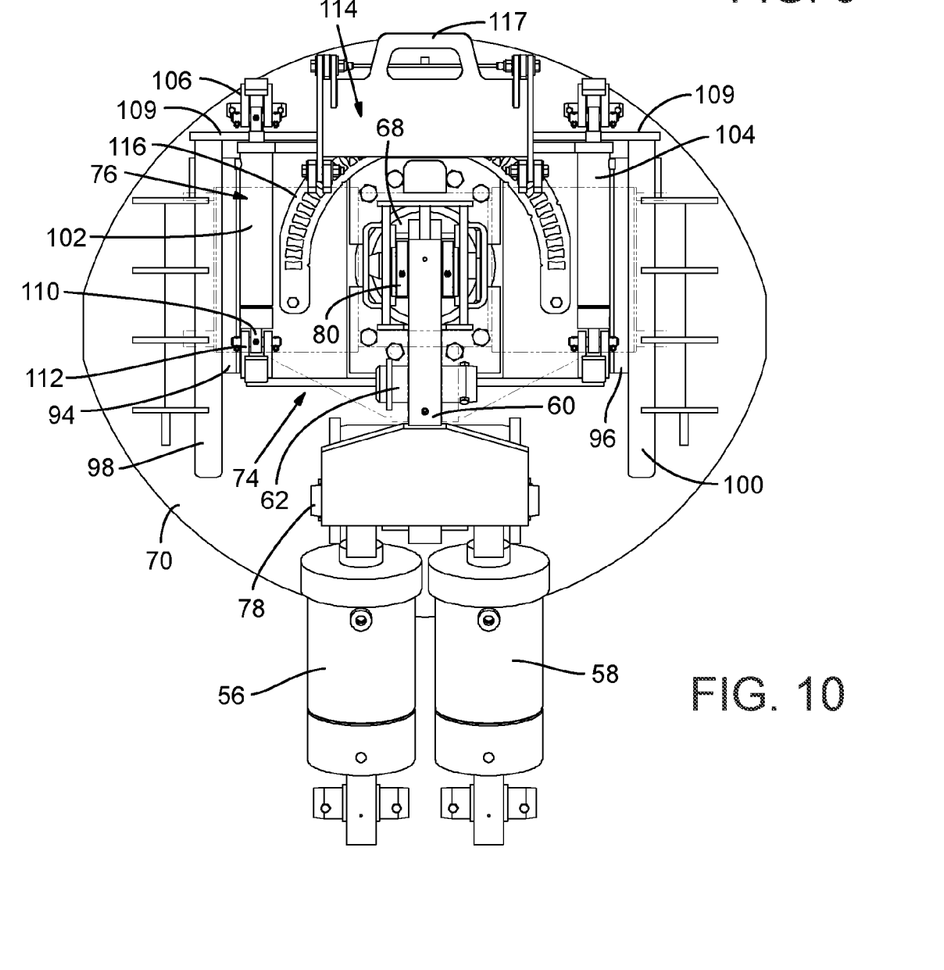
FIG. 10 is an enlarged top plan view of the lifting assembly shown in FIG. 6 in accordance with the present disclosure.

As mentioned previously, first lifting assembly incorporates a roller assembly 74 and a shifter mechanism 76, and these two mechanisms cooperate in function. As shown in FIG. 9, roller assembly 74 includes a roller frame 82 which houses a plurality of laterally-spaced and stacked rollers indicated at 84. The upper surface of the roller frame has a circular opening, defined by a rim 86 which surrounds and is positioned above and is normally spaced apart from the top of a rim 88 formed on a concave end 90 which is joined integrally with the bottom of plunger element 68. Frame 82 also includes a semi-hemispherical or domed section 92, aligned with concave end 90, and normally spaced therefrom, as shown when the main beams are supported on the ground.

Elongate flanges 94 and 96, extending outwardly from opposite sides of roller assembly 74, extend beneath retaining guides 98 and 100 respectively, of foot plate 70, and are retained thereby from relative vertical movement, although shiftable therealong. Roller assembly 74 and foot plate 70 are both seen to be mounted to plunger element 68 and rotatable about a common vertical axis extending through plunger element 68 and well opening 52.

As shown in FIGS. 6, 7, 9 and 10, first shifter mechanism 76 is designed with power-driven travel cylinders 102 and 104 each having an extendable-retractable rod. Travel cylinder 102 is exemplary and so will be described. A first end of the travel cylinder is pivotally connected to a link 106 which in turn is connected at 108 to a lug extending from back wall 109 on foot plate 70. The rod of travel cylinder 102, indicated at 110, is connected to a lug 112 which is mounted on an upper surface of roller assembly 74. With the aforementioned arrangement, it can be seen that travel cylinder 102 is selectively operable for extending rod 110 to shift foot plate 70 in a first direction relative to roller assembly 74 and for retracting the rod to shift foot plate 70 in a second direction opposite to the first direction relative to the roller assembly. In a like manner the second shifting mechanism is designed for operation with the second lifting assemblies.

Each first and second lifting assembly is equipped with a steering mechanism such as generally indicated at 114, which is exemplary, as shown in the top plan view of FIG. 9. Steering mechanism 114 is connected to roller assembly 74 and is selectively operable for rotating roller assembly 74 and foot plate 70 as a unit about a vertical axis extending through plunger element 68 and well 50 to a orient and fix the direction of travel. Of course all the steering mechanisms would necessarily be oriented before any travel in order for synchronization to occur. The steering mechanism here is designed to enable steering to be selected, when the foot plates have been raised and carry no load, in a selected one of multiple modes, namely, longitudinal steering, simple steering, transverse steering, complementary steering, crab steering and circular steering. To implement the orientation necessary for each of these Each steering mechanism is the same and steering mechanism 114, which is exemplary, includes a degreed sector plate 116 mounted on roller assembly 74, and a manual link/handle 117 assembly pivotally mounted on well housing 50 may be selectively moved to engage a pin 118 on sector plate 116 at a predetermined position to fix the orientation of roller assembly 74 and foot plate 70 for a preselected direction and mode of travel.

Method of Operation of the Lifting Assemblies

The present disclosure provides an efficient system adapted for use on a walking machine to transport or move a load along the ground as will now be described, with reference being directed to FIGS. 11A-E. The following description, to simplify things, refers only to main beam 14 and the first and second lifting assemblies mounted thereon. However, it is to be understood that the same sequence of operation will be simultaneously implemented with respect to the first and second lifting assemblies and other operative components, such as the first and second shifter mechanisms on main beam 16. What follows excludes any description of steering other than in a straight line, the use of a steering mechanism using a selector plate construction being known.

However, it will be noted that to implement the orientation necessary for each of steering or traveling mode, the lifting assemblies must be actuate to raise their respective foot plates to disengage from the ground. In this position the main beams and substructure and load will be entirely supported on the ground, with bearing pressure applied downwardly through the main beams onto the ground. The foot plates can then be placed in the desired steering mode, i.e., longitudinal steering, simple steering, etc.

The first step under the design and method of the present disclosure is for the operators of a walking machine is to determine the direction that the walking machine is to be moved. In the sequence that follows, the direction will be to the left, as an example, with straight-ahead steering.

Figure 11A:
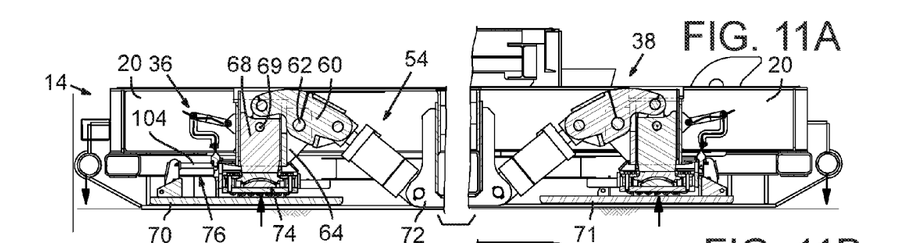
FIGS. 11A-11E are sequential views showing operation of the lifting assemblies on the left and right side of a main beam in shifting the main beam to the left (substructure not shown) in accordance with the present disclosure.

Initially, as shown in FIG. 11A, a view showing main beam 14 cut along its length and in partial cross-section, first and second lifting assemblies 36 and 38, respectively, are actuated so that their respective foot plates 70 and 71 are raised and main beam 14 engages the ground to support the substructure and load. The shifter mechanism on first lifting assembly 36 is extended to displace foot plate 70 in the intended direction of travel, i.e., to the left, as shown. The shifter mechanism on second lifting assembly 38 is retracted, to shift foot plate 71 in the direction of travel, to the left, as shown. The foot plates are now maintained in this position.

Figure 11B:
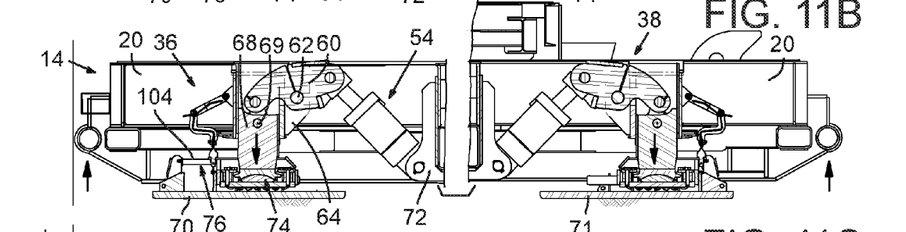

As shown in FIG. 11B, the power-driven cylinders 54 on first lifting assembly 36 are now actuated to extend their rods diagonally upward toward the first end of main beam 14 while the power-driven cylinders of second lifting assembly 38 are simultaneously actuated to extend their rods diagonally upward toward the second end of main beam 14 to direct the foot plates against the ground and raise the main beam off the ground. The substructure and load are now supported by the foot plates.

Figure 11C:
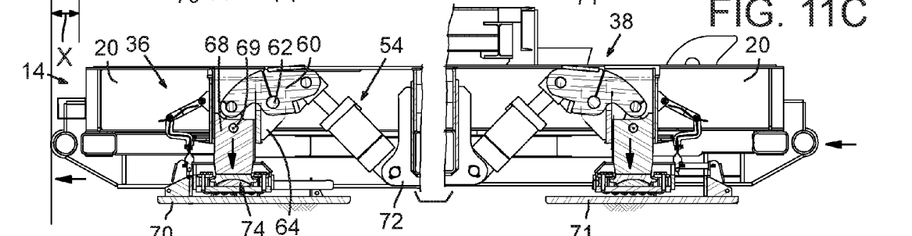

Next, as shown in FIG. 11C, the shifter mechanism on first lifting assembly 36 is retracted while the shifter mechanism on second lifting assembly 38 is simultaneously extended to displace the main beam 14 and substructure in the direction of travel, to the left, a distance shown at "x." The power-driven cylinders may now be retracted to lower main beam 14 onto the ground, and the foot plates are disengaged from the ground and supporting the load, now carried by the main beams. A drilling operation or the like may take now place. If it is desired to again move the walking machine to the left, the steps are repeated. If, however, it is desired to move the walking machine in the opposite direction, to the right, a reverse of the above steps is undertaken.

Figure 11D:
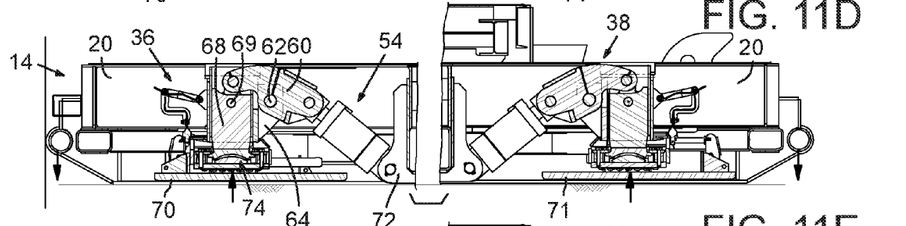
Figure 11E:
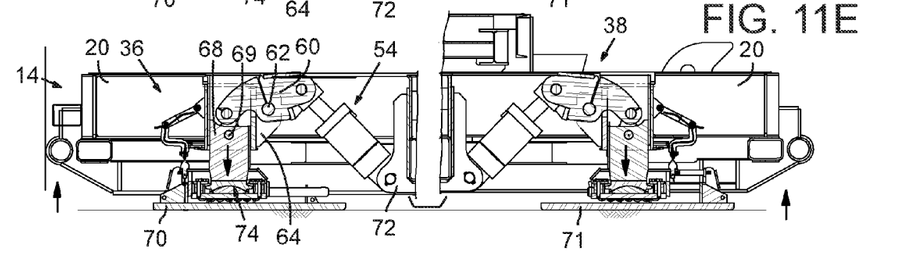

FIG. 11D shows that the shifter mechanism on first lifting assembly 36 has now been retracted, and the shifter mechanism on second lifting assembly 38 has been extended to the right, in the desired direction of travel. This is just the opposite of the operational sequence of the shifter mechanisms when it was desired to move the walking machine to the left. The next step, as shown in FIG. 11E, is actuating the power-driven cylinders on first lifting assembly 36 to extend their rods diagonally upward toward the first end of main beam 14 while simultaneously actuating the power-driven cylinders of second lifting assembly 38 to extending their rods diagonally upward toward the second end of main beam 14 to raise the beam off the ground. The shifter mechanisms may now be actuated to move main beam 14 to the right (not shown).

We claim:

1. A walking machine for moving a load over the ground comprising:
    a substructure having laterally spaced-apart, rigidly interconnected first and second main beams for carrying the load above the ground;
    a first lifting assembly mounted on a first end of each main beam;
    a second lifting assembly mounted on the opposite or second end of each main beam;
    wherein each lifting assembly includes a power-driven actuator connected to a plunger element with a foot plate, the power-driven actuators being selectively operable for extending their plunger elements downwardly to force the foot plates against the ground to raise the main beams and substructure off the ground, and for retracting their plunger elements upwardly to disengage the foot plates from the ground to lower the main beams and substructure;
    wherein each lifting assembly further includes a housing and a rocker arm pivotally connected to the housing; the housing being dimensioned for slideably receiving a plunger element for reciprocal vertical movement therewithin;
    wherein each power-driven actuator is pivotally connected to a first end of its associated rocker arm and the plunger element is pivotally connected to a second end of its associated rocker arm;
    a first shifter mechanism mounted on each first lifting assembly selectively operable for extension and retraction;
    a second shifter mechanism mounted on each second lifting assembly selectively operable for extension and retraction; and
    wherein the first and second shifter mechanisms operate to extend and retract to displace the main beams and the substructure along the ground in a selected direction when the first and second lifting assemblies have raised the main beams and the substructure off the ground.

2. The walking machine of claim 1 wherein the power-driven cylinder of each first lifting assembly is diagonally-mounted on each main beam with its rod directed upwardly toward the first end, and wherein the power-driven cylinder of each second lifting assembly is diagonally-mounted on each main beam with its rod directed upwardly toward the second end.

3. The walking machine of claim 1 wherein each lifting assembly includes:
    a roller assembly having rollers mounted to a bottom end of a plunger element; wherein the foot plate is mounted on the roller assembly for selective engagement with the rollers;

wherein each shifter mechanism includes a power-driven travel cylinder having an extendable—retractable rod, wherein a first end of the travel cylinder is connected to the roller assembly and the rod is connected to the foot plate; and wherein the travel cylinder is selectively operable for extending the rod to shift the foot plate in a first direction relative to the roller assembly and for retracting the rod to shift the foot plate in a second direction opposite to the first direction relative to the roller assembly.

4. The walking machine of claim 3 wherein the roller assembly and foot plate are both mounted to the plunger element and rotatable about a common vertical axis extending through the plunger element and well opening, wherein a steering mechanism is connected to each roller assembly selectively operable for rotating the roller assembly and foot plate as a unit about a vertical axis extending through the plunger and well to a orient and fix the direction of travel of the main beams in a preselected direction.

5. The walking machine of claim 4 wherein each steering mechanism includes a degreed sector plate mounted on the roller assembly, and wherein a manual link pivotally mounted on the well housing may be selectively moved to engage the sector plate at a predetermined position to fix the orientation of the roller assembly and foot plate for a preselected direction of travel.

6. A walking machine for moving a load over the ground comprising:
a substructure having laterally spaced-apart, rigidly interconnected first and second main beams for carrying the load above the ground;
a first lifting assembly mounted on a first end of each main beam;
a second lifting assembly mounted on the opposite or second end of each main beam;
wherein each lifting assembly includes a pair of hydraulic power-driven cylinders each with an extendable/retractable rod connected to a plunger element with a foot plate, the power-driven cylinders being selectively operable for extending their rods to push the plunger elements downwardly to force the foot plates against the ground to raise the main beams and substructure off the ground, and for retracting their rods to pull the plunger elements upwardly to disengage the foot plates from the ground to lower the main beams and substructure;
wherein the power-driven cylinders on the first lifting assemblies are diagonally-mounted, side-by-side on each main beam with their rods directed upwardly toward the first ends of those main beams;
wherein the power-driven cylinders on the second lifting assemblies are diagonally-mounted, side-by-side on each main beam with their rods directed upwardly toward the second ends of those beams;
a first shifter mechanism mounted on each first lifting assembly selectively operable for extension and retraction;
a second shifter mechanism mounted on each second lifting assembly selectively operable for extension and retraction; and
wherein the first and second shifter mechanisms operate to extend and retract to displace the main beams and the substructure along the ground in a selected direction when the first and second lifting assemblies have raised the main beams and the substructure off the ground.

7. The walking machine of claim 6 wherein each lifting assembly includes:
a subframe mounted on each main beam;
a well housing mounted on each subframe having a well dimensioned for slideably receiving a plunger element for reciprocal vertical movement therewithin.

8. The walking machine of claim 7 wherein each lifting assembly includes:
a rocker arm pivotally connected to the well housing, wherein the rod of each power-driven cylinder is pivotally connected to a first end of the rocker arm and the plunger is pivotally connected to a second end of the rocker arm.

9. The walking machine of claim 8 wherein each lifting assembly includes:
a roller assembly having rollers mounted on the bottom end of a plunger element; wherein the foot plate is mounted on the roller assembly for selective engagement with the rollers;
wherein each shifter mechanism includes a power-driven travel cylinder having an extendable—retractable rod, wherein a first end of the travel cylinder is connected to the roller assembly and the rod is connected to the foot plate; and
wherein the travel cylinder is selectively operable for extending the rod to shift the foot plate in a first direction relative to the roller assembly and for retracting the rod to shift the foot plate in a second direction opposite to the first direction relative to the roller assembly.

10. The walking machine of claim 9 wherein the roller assembly and foot plate are both mounted to the plunger element and rotatable about a common vertical axis extending through the plunger element and well opening; and
a steering mechanism is connected to each roller assembly selectively operable for rotating the roller assembly and foot plate as a unit about a vertical axis extending through the plunger and well to a orient and fix the direction of travel of the main beams in a preselected direction.

11. The walking machine of claim 10 wherein each steering mechanism includes a degreed sector plate mounted on the roller assembly, and wherein a manual link pivotally mounted on the well housing may be selectively moved to engage the sector plate when it has been moved to a predetermined position to fix the orientation of the roller assembly and foot plate for a preselected direction of travel.

12. A lifting mechanism for use on a walking machine having a substructure and laterally spaced-apart, rigidly interconnected first and second main beams for carrying and moving a load above the ground comprising:
a lifting assembly adapted for mounting on one of the main beams including a pair of hydraulic power-driven cylinders each with an extendable/retractable rod connected to a plunger element with a foot plate, each of the power-driven cylinders being selectively operable for extending their rods to push the plunger elements downwardly and for retracting their rods to pull the plunger elements upwardly;
wherein each of the power-driven cylinders is adapted to be diagonally-mounted, side-by-side on a main beam with their rods directed upwardly toward the end of a main beam; and
a shifter mechanism mounted on the assembly selectively operable to extend and retract the foot plate relative to the plunger element.

13. The lifting mechanism of claim 12 wherein each lifting assembly includes a well housing adapted for mounting on each main beam, the well housing formed with a well dimensioned for slideably receiving a plunger element for reciprocal vertical movement therewithin.

14. The lifting mechanism of claim 13 wherein each lifting assembly includes:
a rocker arm pivotally connected to the well housing; and
wherein the rod of each power-driven cylinder is pivotally connected to a first end of the rocker arm and the plunger is pivotally connected to a second end of the rocker arm.

15. The lifting mechanism of claim 14 wherein each lifting assembly includes:
a roller assembly having rollers mounted to a bottom end of the plunger element;
wherein the foot plate is mounted on the roller assembly for selective engagement with the rollers;
wherein each shifter mechanism includes a power-driven travel cylinder having an extendable—retractable rod, wherein a first end of the travel cylinder is connected to the roller assembly and the rod is connected to the foot plate; and
wherein the travel cylinder is selectively operable for extending the rod to shift the foot plate in a first direction relative to the roller assembly and for retracting the rod to shift the foot plate in a second direction opposite to the first direction relative to the roller assembly.

16. The lift mechanism of claim 15 wherein the roller assembly and foot plate are both mounted to the plunger element and rotatable about a common vertical axis extending through the plunger element and well opening, wherein a steering mechanism is connected to each roller assembly selectively operable for rotating the roller assembly and foot plate as a unit about a vertical axis extending through the plunger and well to a orient and fix the direction of travel of the main beams in a preselected direction.

17. The lift mechanism of claim 15 wherein each steering mechanism includes a degreed sector plate mounted on the roller assembly, and wherein a manual link pivotally mounted on the well housing may be selectively moved to engage the sector plate at a predetermined position to fix the orientation of the roller assembly and foot plate for a preselected direction of travel.

18. A method for moving a load over the ground comprising:
supporting the load above the ground on a substructure carried by a pair of spaced-apart, rigidly interconnected first and second main beams;
providing a first lifting assembly on a first end of each main beam and a second lifting assembly on the second end of each main beam;
actuating the first and second lifting assemblies so that their foot plates are raised above the ground and the main beams engage the ground and support the substructure thereby;
extending a shifter mechanism on each first lifting assembly to displace their foot plates in the intended direction of travel and retracting a shifter mechanism on each second lifting assembly to displace their foot plates in the intended direction of travel, thereafter maintaining the foot plates stationary;
actuating power-driven cylinders on each lifting assembly to urge the foot plates against the ground and raise the main beams and substructure above the ground to be supported on the foot plates;
wherein the step of actuating power-driven cylinders on each lifting assembly further includes actuating a pair of power-driven cylinders on each lifting assembly;
wherein the step of actuating a pair of power-driven cylinders further includes extending the rods of a pair of diagonally-mounted power-driven cylinders on each first lifting assembly diagonally upward toward the first end of each main beam and simultaneously extending the rods of a pair of diagonally-mounted power-driven cylinders on each second lifting assembly diagonally upward toward the second end of each main beam; and
retracting the shifter mechanism on each first lifting assembly and simultaneously extending the shifter mechanism on each second lifting assembly to displace the main beams and substructure in the direction of travel.

* * * * *